US012792993B2

(12) United States Patent
Yang et al.

(10) Patent No.: US 12,792,993 B2
(45) Date of Patent: Nov. 10, 2026

(54) METHODS AND SYSTEMS FOR CONTROLLING A RISK BASED ON A DISTRIBUTED FACE LIBRARY

(71) Applicant: FORTUNE&FUTURE HONG KONG LIMITED, Hong Kong (HK)

(72) Inventors: Zaiju Yang, Shanghai (CN); Xi Guo, Shanghai (CN)

(73) Assignee: FORTUNE&FUTURE HONG KONG LIMITED, Hong Kong (HK)

( * ) Notice: Subject to any disclaimer, the term of this patent is extended or adjusted under 35 U.S.C. 154(b) by 443 days.

(21) Appl. No.: 18/477,522

(22) Filed: Sep. 28, 2023

(65) Prior Publication Data

US 2024/0386351 A1 Nov. 21, 2024

(30) Foreign Application Priority Data

May 18, 2023 (CN) ......................... 202310568032.0

(51) Int. Cl.
*G06V 40/16* (2022.01)
*G06Q 10/0635* (2023.01)

(52) U.S. Cl.
CPC ....... *G06Q 10/0635* (2013.01); *G06V 40/168* (2022.01); *G06V 40/172* (2022.01)

(58) Field of Classification Search
CPC ............. G06Q 10/0635; G06V 40/168; G06V 40/172; G06F 21/32; G06F 16/583
See application file for complete search history.

(56) References Cited

U.S. PATENT DOCUMENTS

2018/0068173 A1* 3/2018 Kolleri .................... G06Q 10/10
2021/0084451 A1* 3/2021 Williams ............... A61B 5/165
2021/0174069 A1* 6/2021 Benkreira ............. H04W 12/06

* cited by examiner

*Primary Examiner* — Phuoc Tran
(74) *Attorney, Agent, or Firm* — Porus IP LLC

(57) ABSTRACT

Methods and systems for controlling a risk based on a distributed face library are provided. The method may be implemented by a processor and may include obtaining a living face image and generating a face retrieval demand signal; calling the distributed face library based on the face retrieval demand signal, the distributed face library including a plurality of sub-libraries; matching the living face image through the distributed face library based on a preset retrieval strategy; in response to a determination that the living face image is not matched, returning a first risk result; or in response to a determination that the living face image is matched, returning a second risk result. The living face image may be retrieved and matched quickly through the method for controlling a risk based on a distributed face library, which may quickly recognize a user identity of a unique identifier in a multi-document scenario, thereby improving a risk control capability of the system.

16 Claims, 5 Drawing Sheets

200

METHODS AND SYSTEMS FOR CONTROLLING A RISK BASED ON A DISTRIBUTED FACE LIBRARY

CROSS-REFERENCE TO RELATED APPLICATION

This application claims priority of Chinese Patent Application No. 202310568032.0, filed on May 18, 2023, the contents of which are entirely incorporated herein by reference.

TECHNICAL FIELD

The present disclosure relates to the field of risk identification technology, and in particular, to methods and systems for controlling a risk based on a distributed face library.

BACKGROUND

Somethings usually cannot be controlled in a process of work, thus, risks always exist. A manager may take various measures to reduce a possibility of a risk event or to control possible losses within a certain range to avoid unbearable losses caused by the risk event. At this time, risk control management may often be required. Risk control refers to the risk manager taking various measures and manners to eliminate or reduce the possibility of the risk event, or the risk controller reducing the losses caused by the risk event.

Four basic manners of risk control may include risk avoidance, loss control, risk transfer, and risk retention. No matter which manner of risk control is employed, an accurate risk assessment is a prerequisite. For example, in a credit business, when a user enters an online credit system, a first action performed by a risk control system may include uniquely identifying an identity of the user, and a series of risk control strategies may be formulated based on the unique identifier. If document recognition is used, i.e., the user uploads a photo of a document and a document number is recognized through Optical Character Recognition (OCR), the document number may be the unique identifier of the user. In certain countries and regions, only a document such as a driver's license, a passport, or a social security card covers some people instead of a unified identity document. Therefore, in a multi-document scenario, it may be not possible to uniquely identify the user based on the document number, thereby providing an opportunity for a malicious person to take advantage of. For example, the malicious person may be registered as a new customer for a loan using different documents, and the risk control system may be incapable of detecting whether the malicious person is the new customer. As another example, when a certain document of the user has been blacklisted, the user may still register for a loan using a different type of document, so that the accurate risk identification may not be performed. The accurate risk assessment relies on accurate risk information identification. If the accurate risk information cannot be identified, it may be impossible to make the accurate risk assessment, which may result in losses.

Therefore, it is desirable to provide methods and systems for controlling a risk based on a distributed face library, so that a living face image may be retrieved and matched quickly through the distributed face library, and a user identity of a unique identifier may be quickly recognized in the multi-document scenario, thereby improving a risk control capability of the system.

SUMMARY

One or more embodiments of the present disclosure provide a method for controlling a risk based on a distributed face library. The method may be implemented by a processor and the method may include obtaining a living face image and generating a face retrieval demand signal. The method may also include calling the distributed face library based on the face retrieval demand signal. The distributed face library may include a plurality of sub-libraries. The method may also include matching the living face image through the distributed face library based on a preset retrieval strategy. The method may also include in response to a determination that the living face image is not matched, returning a first risk result, or in response to a determination that the living face image is matched, returning a second risk result.

One of the embodiments of the present disclosure provides a system for controlling a risk based on the distributed face library. The system may include a generation module, a calling module, a matching module, and a feedback module. The generation module may be configured to obtain a living face image and generate a face retrieval demand signal. The calling module may be configured to call the distributed face library based on the face retrieval demand signal. The distributed face library may include a plurality of sub-libraries. The matching module may be configured to match the living face image through the distributed face library based on a preset retrieval strategy. The feedback module may be configured to in response to a determination that the living face image is not matched, return a first risk result, or in response to a determination that the living face image is matched, return a second risk result.

One or more embodiments of the present disclosure provide an intelligent terminal. The intelligent terminal may include a processor and a storage. The storage may store a computer program. When executed by the processor, the computer program may cause the processor to implement a method including obtaining a living face image and generating a face retrieval demand signal; calling the distributed face library based on the face retrieval demand signal, the distributed face library including a plurality of sub-libraries; matching the living face image through the distributed face library based on a preset retrieval strategy; in response to a determination that the living face image is not matched, returning a first risk result; or in response to a determination that the living face image is matched, returning a second risk result.

One or more embodiments of the present disclosure provide a storage medium. The storage medium may store a computer program. When the computer program is executed by the processor, a method for controlling a risk based on a distributed face library may be implemented.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
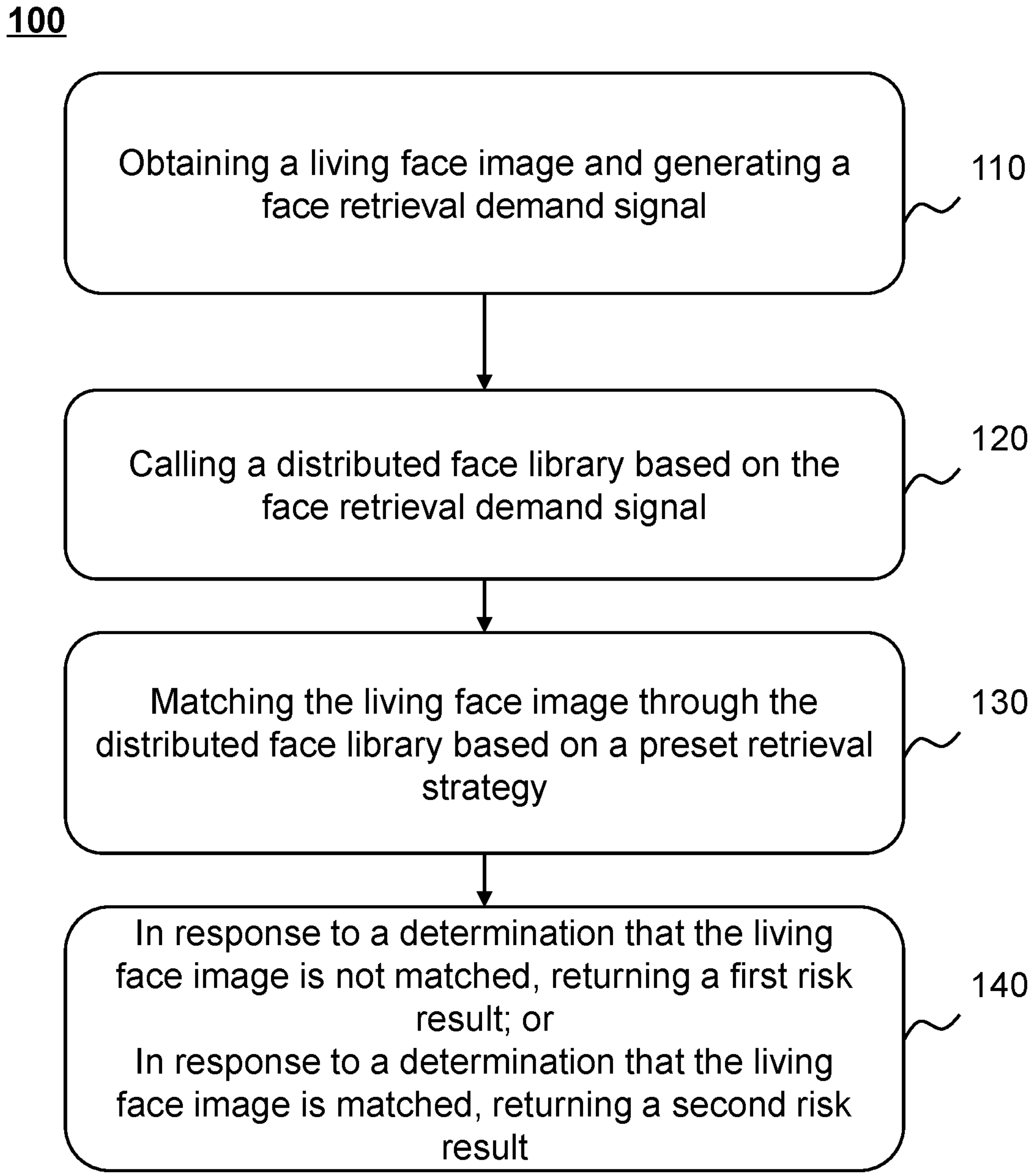
FIG. 1 is a flowchart illustrating an exemplary process of a method for controlling a risk based on a distributed face library according to some embodiments of the present disclosure.

Exemplary embodiments are described in detail herein, examples of which are represented in the drawings. The same numeral in the different drawings described below refers to the same or similar elements unless otherwise indicated. The embodiments described in the following exemplary embodiments are not intended to represent all embodiments consistent with the present disclosure. Instead, the embodiments are only examples of devices and methods that are consistent with some aspects of the present disclosure as detailed in the appended claims.

It should be noted that herein, the terms "comprise," "comprises," and/or "comprising," "include," "includes," and/or "including," or any other variation thereof are intended to include non-exclusive inclusion, so that a process, method, article, or device including a series of elements includes not only those elements but also other elements not expressly listed or elements inherent to in the process, method, article, or device. Without further limitation, the element qualified by the statement "including a . . . " do not exclude that there are other identical elements in the process, method, article, or device that includes the element. Furthermore, components, features, and elements having the same name in different embodiments of the present disclosure may have the same meaning or different meanings. The specific meanings thereof are determined based on the illustration in the specific embodiment or by further combining with the context in the specific embodiment.

It should be noted that in the present disclosure, an operation code such as 210, 220, etc., are adopted to express the corresponding content more clearly and briefly and do not constitute a substantive limitation in order. Those skilled in the art, in a specific implementation, may perform S20 before S10, etc., which should be within the scope of protection of the present disclosure.

It should be understood that the specific embodiments described herein are merely provided to illustrate the present disclosure, but are not intended to limit the present disclosure.

FIG. 1 is a flowchart illustrating an exemplary process of a method for controlling a risk based on a distributed face library according to some embodiments of the present disclosure. In some embodiments, the process 100 may be performed by a processor. As shown in FIG. 1, the process 100 may include the following operations.

In 110, a living face image may be obtained and a face retrieval demand signal may be generated.

The living face image refers to a face image of a user that has been subject to living face recognition. In some embodiments, the processor may perform the living face recognition on the user and retain a frontal face image, etc. The retained frontal face image, etc., may be the living face image.

In some embodiments, the processor may perform the living face recognition in various ways, such as a three-dimensional structured light imaging technology, a deep learning face recognition technology, an eye living detection technology, etc.

The living face recognition refers to determining whether a face is a real face by detecting a biometric feature (e.g., blinking, opening the mouth, or shaking the head) of the face to prevent an attack of a non-real face such as a photo or a video. The processor may collect the living face image through a device side, etc., and perform living face detection to verify whether a face in the detected image is a close-range nude shot of a living face object from an authentication device side, which may be widely used in real-time face collection scenarios to meet the authenticity and security requirements of face registration and authentication.

In some embodiments, the processor may also check quality availability of a current living face image to ensure the completion of a subsequent task. The subsequent task may include a recognition task, a comparison task, etc.

The face retrieval demand signal refers to a signal that characterizes relevant information of a target subject. For example, the relevant information of the target subject may include at least one of an identity card number, a driver's license, a phone number, a gender, an age, etc. The target subject refers to a user whose living face image is currently collected.

In some embodiments, the processor may obtain the relevant information of the target subject input into a system. The processor may generate the face retrieval demand signal based on the relevant information of the target subject. For example, the processor may convert the relevant information of the target subject into an electrical signal, and convert the electrical signal into an electrical signal (i.e., the face retrieval demand signal) transmitted to the distributed face library through a signal modulator, etc.

In some embodiments, in response to a determination that a face feature is recognized in a detection region, the processor may capture a current face image of the target subject through the device side, obtain a preset action image of the target subject, and perform real person verification combined with the current face image. The real person verification may be the living face recognition.

The detection region refers to a region where the face image is captured by the device side. In some embodiments, the device side may capture the face image using a camera or other shooting devices of the device side. The device side may include a mobile phone, a computer, a device used to handle business in a business handling place, etc.

The face feature refers to a feature that characterizes an appearance of a human face. In some embodiments, the face feature may include a face shape, a double-fold eyelid, a beard, etc.

The current face image refers to the current living face image of the target subject.

The preset action image refers to an image of a preset action that is used for real person verification. The preset action image of the target subject refers to an image of a preset action performed by the target subject. For example, the preset action image may include the image of the preset action (e.g., blinking, opening the mouth, or shaking the head) performed by the target subject.

In some embodiments, the processor may determine whether the face is a real face by obtaining the preset action image of the target subject and combining with the current face image to prevent the attack of the non-real face such as a photo or a video.

Taking three-dimensional structured light imaging technology as an example, the processor may obtain a three-dimensional model by performing texture analysis, depth calculation, etc., on the current face image of the target subject using a device such as a structured light projector or a camera, which may effectively prevent an attacker from deceiving the system using a two-dimensional photo. Taking the deep learning face recognition technology as an example, the processor may perform feature extraction and authenticity classification on the current face image of the target subject using a deep learning algorithm such as Convolutional Neural Network (CNN), which may effectively recognize an attack of a prosthesis.

Taking eye living detection technology as an example, the processor may capture video frames of an eye region using the camera and obtain the preset action image including the preset action of blinking, etc., from the video, which may effectively distinguish a static picture and a real human face. Taking voice living detection technology as an example, the processor may recognize a voice of the user and compare the voice with a voice when the current face image of the target subject is collected by requesting the user to perform a voice interaction such as inputting a voice code password, reading aloud specified text, etc., which may enhance the security of face recognition. Merely by way of example, when the current face image of the target subject is captured, the target subject may need to stand in a suitable position and face the camera. The camera or other devices may capture the current face image of the target subject. The target subject may usually be requested to perform the preset action, such as blinking, opening the mouth, etc., to prove that the target subject is a real person. The quality availability of the image may be checked to ensure that the image may be used for the subsequent task such as identification or comparison.

In some embodiments of the present disclosure, it may be verified whether the current face image in the detected picture is the current face image of the user who is target subject to a close-range nude shot of the device side based on the obtained preset action image of the target subject and the performed real person verification combined with the current face image, so as to prevent the attack of the non-real face such as a photo or a video, which may be widely applied in the real-time face collection scenarios to meet the authenticity and security requirements of face registration and authentication.

In 120, the distributed face library may be called based on the face retrieval demand signal.

The face library is a data structure used to store a face identifier, and a face may be stored in the face library for a face search operation. A face library service may be self-built or use a third-party service, and a training sample may come from a publicly available dataset, a blind-released dataset of the system, etc. The dataset may include a plurality of training samples with training labels. Each set of training samples may include two face images. The training label may be whether each set of training samples correspond to a same person. When a set of training samples corresponds to the same person, the training label corresponding to the set of training samples may be 1, which may indicate a positive sample. When a set of training samples corresponds to different persons, the training label corresponding to the set of training samples may be 0, which may indicate a negative sample.

In some embodiments, the face library service may be obtained through training as follows. The plurality of sets of training samples with training labels may be input into an initial face library service, a loss function may be constructed based on the training labels and matching results of the initial face library service, the initial face library service may be iteratively updated based on the loss function, and the training of the face library service may be completed when the loss function of the initial face library service meets a preset condition. The preset condition may be convergence of the loss function, a count of iterations reaching a preset value, etc.

In some embodiments, the face library may adopt a distributed database layout to form the distributed face library. The distributed database system may usually use relatively small computer units that are individually placed at different locations. Each computer unit may store a complete or partial copy of the data and form a local database. The plurality of computer units located at different locations may be connected through a network to form a complete, globally accessible, logically centralized, and physically distributed large-scale complete database. Therefore, the distributed face library adopting the distributed database layout may include a plurality of sub-libraries.

In some embodiments, the processor may determine the plurality of sub-libraries in at least one of the following ways.

In some embodiments, the processor may divide the distributed face library into a plurality of sub-libraries corresponding to a plurality of first attributes, respectively, by using a common attribute of a plurality of types of documents as a division medium.

The common attribute of the plurality of types of documents refers to data commonly included in the plurality of types of documents, such as identity card number, date of birth, gender, etc.

The division medium refers to a basis for dividing the distributed face library.

Merely by way of example, in social applications, a same person may possess the plurality of types of documents. For example, the document such as an identity card, a passport, a driver's license, or a social security card may correspond to the same individual. In order to divide the face library into the sub-libraries effectively, the common attribute of the plurality of types of documents may be selected preferentially as the division medium, such as gender and date of birth. Merely by way of example, assuming that the plurality of types of documents include birthday information, the face library may be divided into 12 sub-libraries based on a month of birth. Regardless of the type of document, each time when a new customer registers, only a sub-library of a specific month may need to be searched, and each time when a regular customer registers, only a sub-library of a specific month may need to be searched, which may provide a relatively high search efficiency during the search.

The new customer refers to a user who uses a system 400 for controlling a risk based on a distributed face library for the first time.

The regular customer refers to a user who has already used the system 400 for controlling a risk based on a distributed face library.

In some embodiments, the processor may determine a data differentiation within each data medium, select a data medium that exceeds a preset differentiation threshold, and divide the distributed face library into the plurality of sub-libraries corresponding to a plurality of second attributes, respectively, according to a data feature of the data medium.

The data medium refers to using data as the division medium.

In some embodiments, data from different sources may have a certain similarity. For example, first-six-digit region codes of identity card numbers of different people may have the similarity. The data differentiation may be used to characterize the similarity degree of the data from different sources. The higher the data differentiation, the lower the similarity degree of the data from different sources. The processor may represent the data from different sources using vectors, and calculate the data differentiation between the data through a vector distance.

The preset differentiation threshold refers to a threshold used to determine whether the data medium corresponding to the data differentiation meets a requirement for dividing the distributed face library. If the data differentiation is greater than the preset threshold, the data medium corresponding to the data differentiation may be used to divide the distributed face library. The processor may set the preset differentiation threshold according to actual needs.

Merely by way of example, when no common attribute of the plurality of types of documents is determined as the division medium, the data medium with a high data differentiation and that is easy to be divided such as a phone number may be selected. The high data differentiation refers to that data of different numbers and segments of the phone number are evenly distributed. Being easy to be divided refers to that the phone number is naturally numerical values, a last digit of the phone number may be taken directly, or a modulo operation may be directly performed. For example, the face library may be divided into 10 sub-libraries based on the last digit of the phone number. As another example, the face library may be divided into 15 sub-libraries by taking the last two digits and performing the modulo operation on 15. After the division, when the new customer registers, all the sub-libraries may need to be queried to confirm whether the customer exists in the face library or not. At this point, a response speed may be speeded up by querying all the sub-libraries concurrently using a plurality of threads. If the new customer does not exist in all the sub-libraries, face information of the new customer may be stored in a specific sub-library (e.g., when the sub-libraries are divided according to the last digit of the phone number, and if the last digit of the phone number of the customer is 0, the face information of the customer may be stored in the sub-library numbered 0), and when a search is performed in the face library for a subsequent regular customer, merely the specific sub-library may need to be queried according to the phone number, which may provide a relatively high search efficiency during the search.

In some embodiments, the processor may mix data of a plurality of data mediums, perform modulo slicing based on a preset hash function, and divide the distributed face library into the plurality of sub-libraries corresponding to a plurality of third attributes, respectively, according to a data slicing result.

The preset hash function refers to a hash function set in advance for data slicing. For example, the preset hash function may include MD5, SHA-1, etc. The data slicing refers to dividing a large database into a plurality of smaller, faster, and more manageable parts.

Data skew refers to a situation where a large number of identical keys are assigned to a same task throughout a calculation process. Hash slicing refers to a manner of data slicing that provides a more uniform distribution of data by performing a hash calculation on target data and taking the reminder of nodes. Merely by way of example, if a significant data skew (e.g., a result divided by gender is 99% male and 1% female) occurs in the data mediums of the scheme mentioned above, the hash slicing may need to be introduced. Specifically, the data of the plurality of data mediums may be mixed, the hash calculation may be performed, and the modulo slicing may be performed.

The hash slicing refers to a commonly used manner of data slicing, which maps key values of data to different data slices through the calculation of the hash function to achieve distributed storage and access of the data. The hash function includes a feature of converting input data with different sizes into output data with fixed-size. When the hash slicing is used, there may be a high probability that different key values are mapped to different data slices due to the randomness of the hash function, thereby achieving the uniform distribution of data. The search efficiency of the face library for the new customer and the regular customer based on the scheme of the method for controlling a risk based on a distributed face library may be relatively high.

In some embodiments of the present disclosure, the plurality of different sub-libraries may be obtained by dividing the sub-libraries in various ways, which may improve the query efficiency of querying in the distributed face library.

In some embodiments, the processor may call the distributed face library based on the face retrieval demand signal in various ways. For example, the processor may call all sub-libraries of the distributed face library based on the face retrieval demand signal.

In some embodiments, the processor may generate a data request field based on the face retrieval demand signal, determine a name, a location, and network configuration of the distributed face library based on the data request field, call a query statement based on the data request field and the name, the location, and the network configuration of the distributed face library, determine connection information of the distributed face library, and send the data request field to a preset node of the distributed face library to make a data connection be established between the preset node and at least one sub-library of the distributed face library.

The data request field refers to a data segment used to request a call to the distributed face library. The data request field may include a plurality of numeric segments. Each numeric segment may represent a type of information. The information may include content of data to be called and an Internet Protocol (IP) address issued by the data request field, etc.

In some embodiments, the processor may analyze and process the face retrieval demand signal and convert the information in the face retrieval demand signal into the data request field. For example, if the face retrieval demand signal includes a need to retrieve a face image of a person whose month of birth is December, the information in the data request field may include requesting to call a sub-library of the distributed face library that meets the retrieval need.

The name of the distributed face library refers to names of the plurality of sub-libraries of the distributed face library on the network, which may be represented by data segments for distinguishing the sub-libraries.

The location of the distributed face library refers to locations where the plurality of sub-libraries of the distributed face library are stored on the network, which may be represented by data segments for distinguishing the storage locations of the sub-libraries.

The network configuration of the distributed face library refers to information related to network connection of the plurality of sub-libraries of the distributed face library, such as network protocols used by the plurality of sub-libraries of the distributed face library.

In some embodiments, the processor may determine the names, the locations, and the network configuration of the plurality of sub-libraries of the distributed face library that are requested to be called from a storage device by analyzing the data request field.

The query statement may be used to find the distributed face library that is requested to be called. For example, the query statement may include DQL, SQL, etc.

The connection information refers to information related to network data transmission of distributed face library, such as an IP address, a port number, a username, a password, etc., of the distributed face library.

In some embodiments, the processor may call the query statement based on the data request field and the names, the locations, and the network configuration of the plurality of sub-libraries of the distributed face library, to find the plurality of sub-libraries of the distributed face library that are requested to be called on the network. When the plurality of sub-libraries of the distributed face library that are requested to be called are found, the connection information of the distributed face library may be obtained from a network router to which the plurality sub-libraries of the distributed face library belong.

The preset node refers to a preset node of the distributed face library used for network data transmission.

Establishing the data connection indicates that the preset node establishes a stable data transmission channel with at least one sub-library of the distributed face library for data transmission.

In some embodiments, the processor may send the data request field to the preset node to make the data connection be established between the preset node and the at least one sub-library of the distributed face library.

In some embodiments, the processor may be directly connected to a master node or a child node for data reading and writing. The query may be sent to one or more middleware. The one or more middleware may be responsible for routing the request to a correct slice or node and returning a result to the user. The middleware refers to a software used to connect the user with the distributed face library, which may be used to manage computing resources and network communications. The processor may query data across a plurality of nodes using a distributed query language (e.g., SQL). The distributed query language may typically aggregate data across different nodes by using operations similar to JOIN and GROUP BY. The processor may call and access a distributed database through an Application Programming Interface (API). In this way, an application may need to communicate with the API, and the API may route the request to an appropriate node and return the result to the application.

In some embodiments, the processor may determine the name, the location, and the network configuration of the distributed database to be accessed. The processor may determine a data table and a field to be queried. The processor may write the query statement (e.g., SQL). If the data across different nodes needs to be aggregated, the operations similar to JOIN and GROUP BY may be needed. The processor may send the query to the one or more middleware or may be directly connected to the master node or the child node for data reading and writing. The middleware or the node may route the request to the correct slice or node and execute the query. Merely by way of example, when calling the distributed face library, the processor may first determine the name, the location, and the network configuration of the distributed face library to be accessed. The processor may determine the data table and the field to be queried. The processor may write the query statement (e.g., SQL). If the data across different nodes needs to be aggregated, the operations similar to JOIN and GROUP BY may be needed. The processor may determine the connection information and send the query to the one or more middleware or may be directly connected to the master node or the child node for data reading and writing. The middleware or the node may route the request to the correct slice or node and execute the query.

In some embodiments of the present disclosure, the name, the location, and the network configuration of the distributed face library may be determined based on the data request field, the query statement may be called, and the connection information of the distributed face library may be determined, which may call the distributed face library quickly and establish the data connection with the at least one sub-library of the distributed face library and save time in looking up the face library, thereby facilitating the subsequent rapid start of matching the living face image.

In 130, the living face image may be matched through the distributed face library based on a preset retrieval strategy.

The preset retrieval strategy refers to a strategy used to retrieve in the distributed face library. In some embodiments, the preset retrieval strategy may include use of an HQL language and a MapReduce mode, a distributed object component model and a common object request broker architecture, a Z39.50 protocol for solving heterogeneous problems between databases in a distributed environment, or a peer-to-peer (P2P) network architecture technology, etc.

In some embodiments, the processor may match the living face image through the distributed face library by using a plurality of distributed retrieval manners based on the preset retrieval strategy. The distributed retrieval refers to a process of retrieving useful information for the user from a large number of, heterogeneous information resources in the distributed environment by using a technology such as distributed computing or mobile agent.

In some embodiments, the processor may obtain a standardized image based on a detected face by performing an alignment operation on the living face image, extract a face feature based on the standardized image to calculate a feature vector of the living face image, and search for a face image whose coincidence degree with the feature vector exceeds a first coincidence threshold in the distributed face library.

Merely by way of example, after collecting the living face image, the processor may need to detect the face in the image, and the purpose of the detection may include recognizing a face region in the image and marking the face region. After detecting the face, the processor may need to perform the alignment operation on the detected face in the living face image. The purpose of the alignment operation may include standardizing the detected face for subsequent feature extraction and comparison. The processor may achieve the alignment operation by rotating, scaling, panning, etc.

The standardized image refers to a face image detected in a living face image after the alignment operation is performed on the living face image. In some embodiments, the processor may extract the face feature from the standardized image in various ways such as a Holistic manner or a deep learning manner.

The feature vector of the living face image may be used to describe the face feature information. In some embodiments, the processor may construct the feature vector based on the face feature extracted based on the standardized image. The processor may construct the feature vector based on the face feature in various ways. For example, the processor may construct the feature vector p based on the face feature (x, y, m), wherein x denotes face shape data corresponding to the face, y denotes whether there is a beard, and m denotes whether the face has a single-fold or double-fold eyelid.

In some embodiments, the processor may search for a face image whose coincidence degree with the feature vector exceeds the first coincidence threshold in the plurality of sub-libraries of the distributed face library where the data connection established.

The coincidence degree refers to data that characterizes a degree of coincidence between the feature vector of the living face image and a face feature vector of the face image in the distributed face library. The coincidence degree may be expressed as a numerical value. The larger the numerical value is, the higher the coincidence degree may be. The face image refers to a face image in the sub-library where the data connection is established. More details about a manner of constructing the face feature vector may be found elsewhere in the present disclosure, such as the manner of constructing the feature vector of the living face image.

The first coincidence threshold refers to a numerical value of the coincidence degree that determines whether the living face image corresponding to the feature vector exists in the distributed face library. For example, the first coincidence threshold may be a minimum value of the coincidence degree of the living face image existing in the distributed face library.

In some embodiments, the processor may determine the coincidence degree between the face feature vector of the face image in the distributed face library and the feature vector of the living face image by calculating a distance between the face feature vector of the face image in the distributed face library and the feature vector of the living face image. The distance may be negatively correlated with the coincidence degree. In some embodiments, the distance may include, but is not limited to, a cosine distance, an Euclidean distance, etc.

In some embodiments, if the processor determines that the face image whose coincidence degree with the feature vector exceeds the first coincidence threshold in the distributed face library, the processor may determine that the living face image corresponding to the feature vector exists in the distributed face library.

In some embodiments, since each user corresponding to a face image in the distributed face library is unique, the user corresponding to the face image whose coincidence degree with the feature vector exceeds the first coincidence threshold may also be unique.

In some embodiments, the face feature may be extracted based on the standardized image to calculate the feature vector of the living face image, and the face image whose coincidence degree with the feature vector exceeds the first coincidence threshold in the distributed face library may be searched, which may determine whether the living face image exists in the distributed face library easily and achieve rapid recognition of the user identity of the unique identifier in the multi-document scenario, thereby ensuring risk control of business handling.

In some embodiments, in response to a determination that no target image exists in a current sub-library, the processor may determine a candidate face image of the current sub-library. The processor may determine, based on the candidate face image, a first associated image of the candidate face image through a face knowledge graph. The processor may determine whether a first association-coincidence degree between the current face image and the first associated image is greater than the first coincidence threshold. In response to a determination that the first association-coincidence degree is smaller than or equal to the first coincidence threshold, the processor may proceed to a next sub-library. More descriptions regarding the above process may be found in FIG. 2.

In some embodiments, in response to a determination that no target image exists in the current sub-library, the processor may determine the candidate face image of the current sub-library. The processor may determine, based on the candidate face image, a second associated image of the candidate face image through the face knowledge graph. The processor may determine whether a second association-coincidence degree between the current face image and the second associated image is greater than a third coincidence threshold. In response to a determination that the second association-coincidence degree is greater than the third coincidence threshold, the processor may adjust a fraud risk of the target subject. In response to a determination that the second association-coincidence degree is smaller than or equal to the third coincidence threshold, the processor may proceed to a next sub-library. More descriptions regarding the above process may be found in FIG. 3.

In some embodiments, in response to a determination that a matching misjudgment of the living face image occurs, the processor may adjust the first coincidence threshold or retrain the distributed face library.

Since a pre-trained dataset is not always equivalent to a dataset of actual business handling, the difference may affect the first coincidence threshold for determining a same face. For example, when cold start-up is performed, the system may be trained based on a public dataset, and at this time, the first coincidence threshold that the face library determines the same face may be 60. However, after real user data is accumulated for a period of time, it may be found that 60 is not sufficient to determine that two faces belong to the same person, and the first coincidence threshold may need to be increased to 65 to determine that two faces belong to the same person. In this case, it may be necessary to introduce a means of supervision of a face determination threshold offset to promptly adjust the first coincidence threshold.

The supervision and feedback on the face determination threshold offset may need to periodically review a judgment near a boundary of the first coincidence threshold. In response to a determination that the misjudgment (e.g., the system determines that two faces that do not belong to a same person belong to the same person or determines that two faces belong to the same person belong to different persons) occurs near a current first coincidence threshold through the review, the first consideration may be given to whether the misjudgment may be resolved by adjusting the first coincidence threshold. For example, if an original first coincidence threshold is 60 and the first coincidence threshold needs to be adjusted to 65 for judgment, the first coincidence threshold may be adjusted to 65 preferentially. If the misjudgment fails to be resolved by adjusting the first coincidence threshold, the face library service of the distributed face library may be retrained. Merely by way of example, when a difference between the face features of pre-trained persons and actual persons being processed is significant, for example, if a face dataset of white faces is used for pre-training, however, the business is handled by the black race actually, it may be necessary to retrain the face library service of the distributed face library to ensure accurate recognition and improve the accuracy of risk assessment.

In some embodiments, the processor may retrain the face library service of the distributed face library based on a newly added or an updated dataset. More descriptions regarding the training of the face library service of the distributed face library may be found in the operation 120 and the relevant descriptions thereof.

In some embodiments, in response to a determination that a matching misjudgment of the living face image occurs, the first coincidence threshold may be adjusted or the distributed face library may be retrained, which may recognize the user identity of the unique identifier quickly and accurately and avoid losses caused by inaccurate risk identification.

In 140, in response to a determination that the living face image is not matched, a first risk result may be returned, or in response to a determination that the living face image is matched, a second risk result may be returned.

The first risk result refers to a probability of risky behavior of a user corresponding to the face when the living face image is not matched. The probability of risky behavior refers to a probability that a user has the risky behavior. The first risk result may correspond to a relatively low probability of risky behavior. The risky behavior refers to a behavior of the user that does not comply with a rule of a handled business. The second risk result refers to a probability of risky behavior of the user corresponding to the face when the living face image is matched. The second risk result may correspond to a relatively high probability of risky behavior. The processor may adopt different processing manners for different risk results.

Merely by way of example, if the living face image is not matched in the face library, it may indicate that the person corresponding to the living face image handles the business for the first time. If the living face image is matched in the face library, it may indicate that the person corresponding to the living face image have handled the business multiple times. For example, for a loan business, a person whose new face image stores in the distributed face database for the first time may be considered to have a relatively low risk. A person corresponding to a face that has already stored in the distributed face library may register a new identity using a different document and handle business again, which may be a high-risk behavior and have a suspicion of loan fraud. Thereafter, an approval process of the business applied for by the person corresponding to the living face image may be carried out based on the returned risk result and the business rule corresponding to the returned risk result.

Merely by way of example, the processor may input a face image of a new customer into a pre-trained distributed face library for searching, and the distributed face library may return a plurality of numerical pairs of face information with coincidence degree score s: <face_token, coincidence degree score>. The face_token denotes a unique identifier of a face in the face library. The higher the coincidence degree score is, the more similar the two faces may be. The processor may determine the first coincidence threshold when the face library is pre-trained. If the coincidence degree score is within a range of 0 to 100, and 60 is the first coincidence threshold, the processor may determine that the two faces are the same when the coincidence degree score is greater than or equal to 60.

If a greatest coincidence degree score returned by the face library search does not reach 60 or no coincidence degree information is returned, it may indicate that the face has never been stored in the library, and the processor may add the face to the distributed face library. Conversely, if the greatest coincidence degree score returned by the distributed face library search reaches 60 points, it may indicate that the face has been stored in the library. In some applications such as the loan business, the risk control system may reject the user from handling business with an account of a person whose face has been stored in the distributed face library.

In some embodiments, in response to a determination that the living face image is not matched, the returning a first risk result may include that: the processor may store the living face image to a sub-library corresponding to the living face image of the distributed face library based on a preset library division strategy.

The preset library division strategy refers to a plan for distributing the living face image to the sub-library corresponding to the living face image for storage. In some embodiments, the preset library division strategy may be set in advance based on prior knowledge or historical experience.

In some embodiments, the sub-library corresponding to the living face image refers to a sub-library that matches the face feature of the living face image. For example, if the living face image corresponds to a person whose month of birth is December, the sub-library corresponding to the living face image may store a face image of a person born in December.

Merely by way of example, if the living face image does not exist in all sub-libraries, the living face image may be stored in a specific sub-library in a current business process for risk determination in a next business process.

In some embodiments of the present disclosure, the living face image may be stored in the sub-library corresponding to the living face image of the distributed face library based on the preset library division strategy, so that the living face image may be stored in an appropriate sub-library and the face images in the distributed face library may be more comprehensive through continuous storage, which may be conducive to subsequent matching of the living face image and improving the accuracy of risk assessment.

In some embodiments, the processor may record a calling duration of the distributed face library, and in response to a determination that the calling duration exceeds a preset duration threshold, the processor may generate a warning notification to redistribute the sub-library of the distributed face library.

The calling duration refers to a time spent in calling the distributed face library. In some embodiments, a large cardinality of users may lead to a slow response speed of calling the distributed face library or even service unavailability, resulting in a user churn. Therefore, it may be necessary to supervise and feedback on the calling duration of the distributed face library and reduce the time spent by the user.

The preset duration threshold refers to a preset threshold for determining whether the calling duration is too long and the warning notification needs to be issued. In some embodiments, the preset duration threshold may be a maximum value of the calling duration.

The warning notification refers to a notification issued to an administrator of the system when the calling duration exceeds the preset duration threshold. The warning notification may remind the administrator to redistribute the sub-library of the distributed face library.

For example, when the calling duration of the distributed face library exceeds the preset duration threshold (e.g., 3 seconds, which may be specifically determined by conducting a buried-point test at a front end, and the threshold may need to be smaller than 3 seconds as small as possible if a majority of users choose to exit or perform other operations after waiting for 3 seconds), the warning notification may be issued to the corresponding administrator, and the administrator may determine whether to split the distributed face library based on a specific situation. If an occasional timeout due to network jitter may be ignored, however, if the timeout is frequent or the service is unresponsive, the library may be considered to be split. If the distributed face library has already been split, it may be considered whether to split the distributed face library again in more detail. For example, if the library was originally split quarterly, the library may now be split monthly until the calling duration meeting the demand is achieved.

In some embodiments of the present disclosure, the calling duration of the distributed face library may be recorded, and in response to a determination that the calling duration exceeds the preset duration threshold, the warning notification may be generated to redistribute the sub-library of the distributed face library, which may supervise the calling duration of the distributed face library, reduce the time spent by the user, and avoid user loss churn due to excessively long calling duration of the distributed face library.

In some embodiments of the present disclosure, the method for controlling a risk based on a distributed face library may be widely applied in the real-time face collection scenarios to meet the authenticity and security requirements for face registration and authentication, and realize the construction of a risk control system based on the unique identifier of the a user without the unified identity document. After the risk control system is established, a risk control strategy may be accordingly formulated. The living face image may be quickly retrieved and matched through the distributed face library, which may achieve rapid recognition of the unique identity of the user in the multi-document scenario, thereby enhancing the risk control capability of the system.

Figure 2:
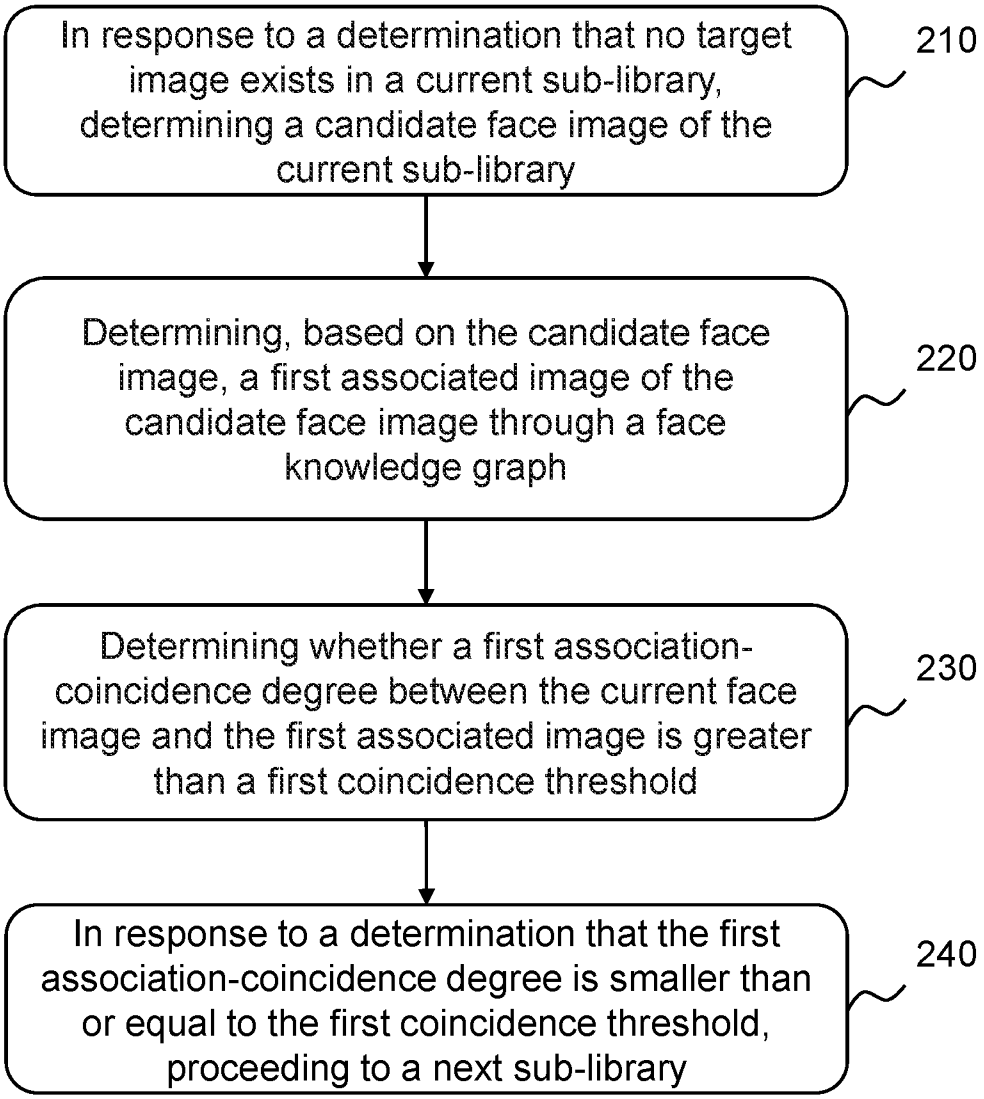
FIG. 2 is a flowchart illustrating an exemplary first process for matching a living face image through a distributed face library according to some embodiments of the present disclosure.

FIG. 2 is a flowchart illustrating an exemplary first process for matching a living face image through a distributed face library according to some embodiments of the present disclosure. In some embodiments, the process 200 may be performed by a processor. As shown in FIG. 2, the process 200 may include the following operations.

In 210, in response to a determination that no target image exists in a current sub-library, a candidate face image of the current sub-library may be determined.

The current sub-library refers to a sub-library where the living face image is currently matched.

The target image refers to an image whose coincidence degree with a current face image of a target subject is greater than a first coincidence threshold. More descriptions regarding the first coincidence threshold and the current face image may be found in FIG. 1 and the relevant descriptions thereof.

The candidate face image refers to an image whose coincidence degree with the current face image of the target subject is greater than a second coincidence threshold but smaller than the first coincidence threshold. The second coincidence threshold refers to a minimum value of the coincidence degree that determines the candidate face image. In some embodiments, the second coincidence threshold may be smaller than the first coincidence threshold. More descriptions regarding the coincidence degree may be found in FIG. 1 and the relevant descriptions thereof. In some embodiments, a plurality of candidate face images may be provided.

In some embodiments, the processor may match the current face image of the target subject in the current sub-library and determine a face image in the current sub-library whose coincidence degree with the current face image of the target subject is greater than the second coincidence threshold and smaller than the first coincidence threshold as the candidate face image. More descriptions regarding the matching the living face image may be found in the operation 130 in FIG. 1 and the relevant descriptions thereof.

In 220, a first associated image of the candidate face image may be determined through a face knowledge graph based on the candidate face image.

The face knowledge graph refers to a knowledge graph that includes association relationship information of all face images in the distributed face library.

Figure 3:
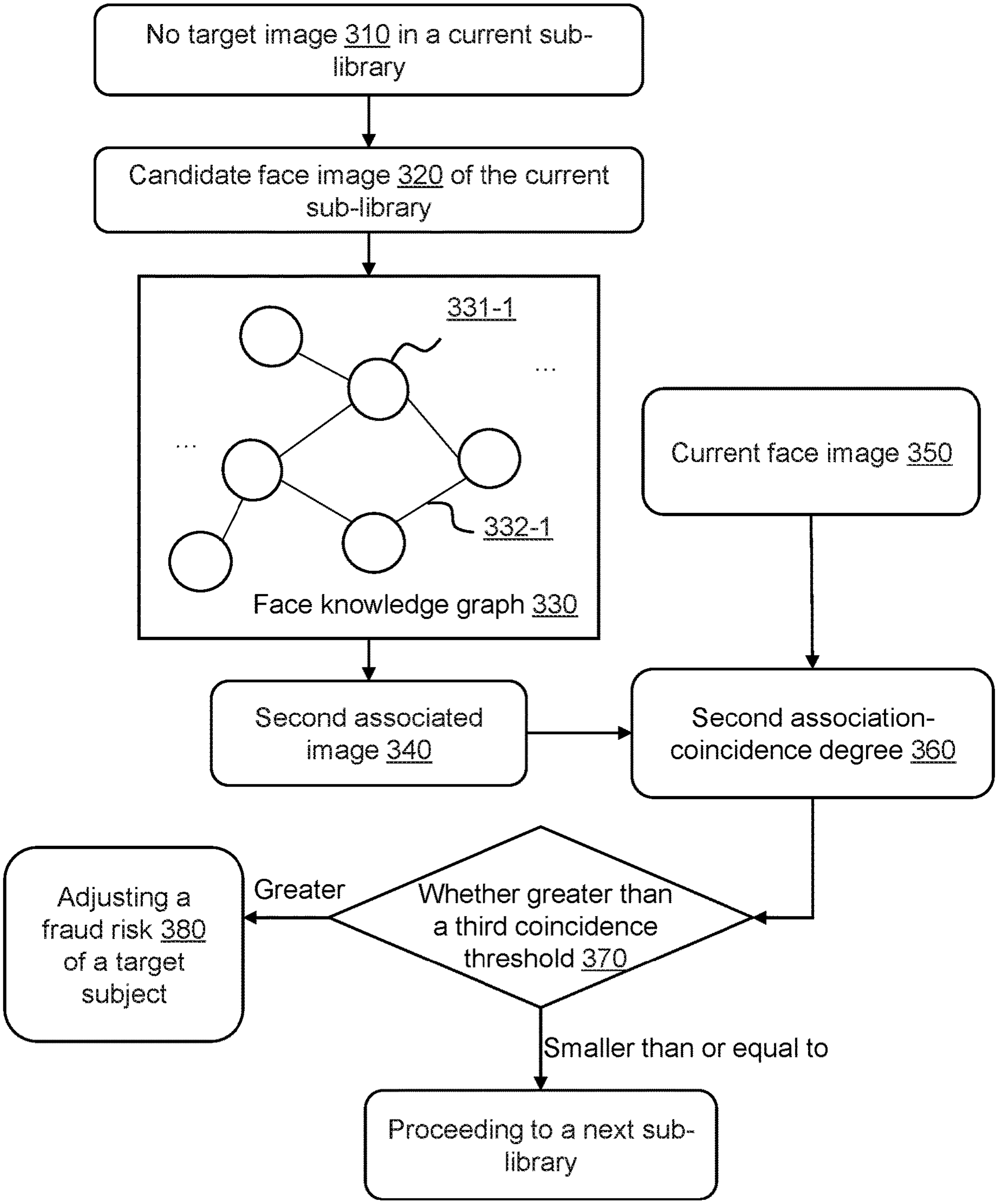
FIG. 3 is an exemplary schematic diagram illustrating a second process for matching a living face image through a distributed face library according to some embodiments of the present disclosure.

In some embodiments, the processor may construct a face knowledge graph 330 based on the association relationship information of all the face images in the distributed face library. As shown in FIG. 3, nodes of the face knowledge graph 330 may include all the face images (e.g., a node face image 331-1) of the distributed face library. For example, the nodes may include face images of different persons in the distributed face library, face images of a same person at different times, etc.

A node feature may include attribute information of a user to whom the face image belongs. The attribute information of the user to whom the face image belongs may include identity information (e.g., a name, a gender, an age, names of parents, a business that has been handled and a handling time, an identity card number, or a mobile phone number) of the user to whom the face belongs.

An edge of the face knowledge graph 330 may characterize an association relationship (e.g., an edge association relationship 332-1) between nodes.

In some embodiments, as shown in FIG. 3, the edge of the face knowledge graph 330 may include an association relationship between any nodes. An edge feature may include a first association relationship and a second association relationship. The first association relationship may indicate that faces corresponding to two nodes belong to a same person. The second association relationship may indicate that the faces corresponding to the two nodes have a kinship relationship. In some embodiments, when the faces corresponding to the two nodes belong to the same person or have a kinship relationship, the processor may connect the two nodes and determine the two nodes as the edge. The kinship relationship may include a close relative, a distant relative, etc.

In some embodiments, the association relationship may be obtained in various ways. For example, the processor may determine the association relationship based on information of a relative who has handled the business entered by the user voluntarily during registration. As another example, if confidentiality qualification of a company meets requirements and the company is allowed to access a public security system, the processor may obtain the association relationship based on household registration information of the public security system.

The first associated image refers to face images of a candidate subject corresponding to the candidate face image at different times. For example, the first associated image may include face images of the candidate subject at the age of 20, 30, etc. The candidate subject corresponding to the candidate face image refers to a person corresponding to the candidate face image. In the present disclosure, the reference to “a subject or an associated subject corresponding to a (face) image” refers to a person corresponding to the (face) image.

In some embodiments, the processor may determine the first associated image for each candidate face image respectively through the face knowledge graph. For example, in the face knowledge graph, the processor may respectively determine a node corresponding to the candidate face image, determine at least one node that has the first association relationship with the node through an edge of the node, and determine at least one face image corresponding to the at least one node that has the first association relationship as at least one first associated image corresponding to the candidate face image.

In 230, whether a first association-coincidence degree between the current face image and the first associated image is greater than the first coincidence threshold may be determined.

The first association-coincidence degree may be used to characterize the coincidence degree between the current face image and the first associated image.

In some embodiments, the processor may determine the first association-coincidence degree in various ways. For example, the processor may calculate a similarity degree between the current face image and the at least one first associated image corresponding to the candidate face image respectively, and determine the first association-coincidence degree based on a similarity degree lookup reference table. The reference table may include a correspondence between the similarity degree and the first association-coincidence degree, and the reference table may be determined based on prior knowledge and historical experience. The similarity degree may be used to characterize a degree of similarity between the current face image and the at least one first associated image corresponding to each candidate face image. In some embodiments, the similarity degree may be represented by a numerical value. The larger the value is, the greater the similarity degree may be.

In some embodiments, the processor may determine the first association-coincidence degree in various ways. For example, the processor may determine the coincidence degree between the current face image and the at least one first association image corresponding to the candidate face image by calculating a distance between a feature vector of the current face image and a feature vector of the at least one first associated image corresponding to the candidate face image. The first association-coincidence degree may be calculated in a similar way of calculating the coincidence degree between the face image and the living face image. More descriptions regarding the calculating the coincidence degree between the face image and the living face image may be found in FIG. 1.

In some embodiments, the processor may determine the first association-coincidence degree through weighting based on the similarity degree between the current face image and the first associated image. A weight of the similarity degree may be related to a distance between a first age label of the first associated image and a second age label of the target subject. In some embodiments, a plurality of first associated images may be provided.

In some embodiments, the weight of the similarity degree may be negatively correlated with the distance between the first age label of the at least one first associated image corresponding to each candidate face image and the second age label of the target subject. For example, the smaller the distance is, the greater the weight of the similarity degree may be. The distance between the first age label and the second age label refers to a difference between a first age and a second age.

The first age label refers to an age of a target subject corresponding to the first associated image when the first associated image is taken. In some embodiments, the first age label may be obtained from a node feature of the target subject corresponding to the first associated image in the face knowledge graph. In some embodiments, the processor may determine the first age label based on an age recognition model, which may be found below in FIG. 2.

The second age label refers to a current age of the target subject. More descriptions regarding obtaining the second age label may be found in the relevant descriptions of FIG. 2 below.

Merely by way of example, a first associated image A corresponding to a certain candidate face image may be provided, and the first associated image may include image 1, image 2, and image 3. The image 1, image 2, and image 3 may be face images of the person corresponding to the candidate face image at different times. The processor may calculate the first association-coincidence degree between the current face image and the first associated image A corresponding to the candidate face image based on the following equation:

$$S=k_1*S_1+k_2*S_2+k_3*S_3,$$

wherein S denotes the first association-coincidence degree between the current face image and the first associated image A corresponding to the candidate face image, $S_1$, $S_2$, and $S_3$ denote similarity degrees between the current face image and the image 1, image 2, image 3, respectively, and $k_1$, $k_2$, and $k_3$ denote weights corresponding to the similarity degrees $S_1$, $S_2$, and $S_3$, respectively. If the distance between the first age label of image 1 and the second age label of the current face image is the greatest, the weight $k_1$ may be the smallest.

In some embodiments, the processor may determine the first association-coincidence degree by performing a weighted summation based on the similarity degree of the current face image and the at least one first associated image corresponding to each candidate face image.

In some embodiments, the processor may obtain the second age label in various ways. For example, the processor may obtain the second age label through information voluntarily entered by the target subject.

In some embodiments, the processor may determine the second age label and/or the first age label based on the current face image and/or the first associated image through the age recognition model. The age recognition model may be a machine learning model.

The age recognition model refers to a model used to determine an age. In some embodiments, the age recognition model may be a machine learning model. For example, the age recognition model may include a Convolutional Neural Networks (CNN) model, a Neural Networks (NN) model, other customized model structures, or the like, or any combination thereof.

In some embodiments, an input of the age recognition model may include the current face image and/or the first associated image, and an output may include the second age label corresponding to the current face image and/or the first age label corresponding to the first associated image. In some embodiments, the processor may determine an age corresponding to an arbitrary face image based on the arbitrary face image through the age recognition model.

In some embodiments, the age recognition model may be trained based on a large number of age training samples with labels. The age training samples may be sample face images, and the labels of the age training samples may be current ages of subjects corresponding to the sample face images. In some embodiments, the age training samples may be obtained based on face library data, and the labels may be determined based on manual labeling.

In some embodiments, the age recognition model may be obtained by training as follows. The plurality of age training samples with labels may be input into an initial age recognition model. A loss function may be constructed based on the labels and a prediction result of the initial age recognition model. The initial age recognition model may be iteratively updated based on the loss function until the loss function meets a preset condition. The preset condition may include convergence of the loss function, a count of iterations reaching a preset value, etc.

In some embodiments of the present disclosure, the second age label and/or the first age label may be determined through the age recognition model based on the current face image and/or the first associated image, so that the current age of any person may be automatically obtained without active input, which can make the process easier and more convenient.

In some embodiments, the processor may compare a greatest first association-coincidence degree of a plurality of first association-coincidence degrees with the first coincidence threshold. If the greatest first association-coincidence degree is greater than the first coincidence threshold, a candidate face image corresponding to the greatest first association-coincidence degree may match with the current face image.

In some embodiments, in response to a determination that the current face image is matched in the current sub-library, the processor may return a second risk result. More descriptions regarding the second risk result may be found in FIG. 1 and the relevant descriptions thereof.

In some embodiments of the present disclosure, the first association-coincidence degree may be determined by performing the weighted summation based on the similarity degree between the current face image and the at least one first associated image corresponding to the candidate face image, which may take into account the age distance between the age corresponding to the first associated image and the age of the target subject, thereby obtaining a more accurate first association-coincidence degree.

In 240, in response to a determination that the first association-coincidence degree is smaller than or equal to the first coincidence threshold, a next sub-library may be proceeded to.

The next sub-library refers to a next sub-library where the living face image matching is performed.

In some embodiments, the processor may select the next sub-library in various ways. For example, the processor may randomly select the next sub-library. As another example, if the sub-libraries are divided by addresses or regions to which mobile phone numbers belong, the processor may select a closest sub-library based on information uploaded by the target subject as the next sub-library. The information uploaded by the target subject may include the mobile phone number, the address, etc. The closest sub-library refers to a sub-library that includes face information closest to the information uploaded by the target subject. For example, if the information uploaded by the target subject is that the month of birth is December, the closest sub-library may be the sub-library that includes the face image corresponding to the month of birth of December.

The above operations may be repeated until the face image matching the current face image is found in the sub-library, or if no face image matching the current face image is found after the sub-libraries that need to be traversed are traversed, the matching process may be terminated.

When the sub-libraries that need to be traversed are traversed, however, no face image matching the current face image is found, the first risk result may be returned. More description regarding the first risk result may be found in FIG. 1.

In some embodiments of the present disclosure, the at least one first associated image of the candidate face image may be determined through the face knowledge graph, and the first association-coincidence degree may be determined, so that the living face recognition of the target subject may be further performed based on the associated images of the current face image of the target subject when the target image is not found in the current sub-library, which can make the result of living face recognition more accurate.

FIG. 3 is an exemplary schematic diagram illustrating a second process for matching a living face image through a distributed face library according to some embodiments of the present disclosure.

In some embodiments, when no target image 310 exists in a current sub-library, the processor may determine a candidate face image 320 of the current sub-library. More descriptions may be found in FIG. 2 and the related descriptions thereof.

In some embodiments, the processor may determine a second associated image 340 of the candidate face image based on the candidate face image through a face knowledge graph 330. More descriptions regarding the candidate face image and the face knowledge graph may be found in FIG. 2 and the related descriptions thereof.

In some embodiments, the processor may determine whether a second association-coincidence degree 360 between the current face image 350 and the second associated image 360 is greater than a third coincidence threshold 370. In response to a determination that the second association-coincidence degree 360 is greater than the third coincidence threshold, the processor may adjust a fraud risk of a target subject, or in response to a determination that the second association-coincidence degree 360 is smaller than or equal to the third coincidence threshold, the processor may proceed to a next sub-library.

The second associated image 340 refers to a face image of an associated subject.

The associated subject refers to a person who has an association relationship with a candidate subject corresponding to the candidate face image. In some embodiments, the association relationship may include a second association relationship, and the associated subject may include a relative of the candidate subject corresponding to the candidate face image. More descriptions regarding the second association relationship may be found in FIG. 2 and the related descriptions thereof.

In some embodiments, the processor may determine the second associated image 340 of each candidate face image through the face knowledge graph 330. In the face knowledge graph, the processor may respectively determine a node corresponding to the candidate face image, determine at least one node that has the second association relationship with the node through an edge of the node, and determine at least one face image corresponding to the at least one node that has the second association relationship as at least one second associated image corresponding to the candidate face image.

The second association-coincidence degree 360 is used to characterize a coincidence degree between the current face image 350 and the second associated image. The second association-coincidence degree between the current face image and the second associated image may be determined in a similar way of determining the first association-coincidence degree between the current face image and the first associated image. More descriptions regarding the determining the first association-coincidence degree between the current face image and the first associated image may be found in FIG. 2.

The third coincidence threshold refers to a threshold used to determine whether a candidate subject corresponding to the current face image 350 has a risky behavior. In some embodiments, the third coincidence threshold may be preset. The third coincidence threshold may be smaller than the first coincidence threshold and greater than the second coincidence threshold.

In some embodiments, if the second association-coincidence degree 360 is greater than the third coincidence threshold, it may indicate that the target subject has the risky behavior such as insurance fraud or loan fraud.

A fraud risk 380 refers to a possibility that the target subject has a fraud behavior.

Merely by way of example, if the associated subject corresponding to the second associated image is the father of the candidate subject corresponding to the candidate face image, and a face image of the father of the candidate subject corresponding to the candidate face image is connected to a face image of the target subject ten years ago in the face knowledge graph, it may indicate that the father of the candidate subject corresponding to the candidate face image may be the same person as the target subject. Therefore, the target subject may have handled the business ten years ago, and now the target subject handles the business again, and in this case, it may be necessary to consider whether the target subject has the fraud risk, such as insurance fraud or loan fraud.

In some embodiments, the processor may adjust the fraud risk 380 of the target subject in various ways. For example, in response to a determination that the second association-coincidence degree between one or more second associated images and the current face image is greater than the third coincidence threshold, it may indicate that the target subject may have the risky behavior such as insurance fraud or loan fraud, and it may be necessary to adjust the fraud risk of the target subject. The processor may increase the fraud risk of the target subject by one or more preset values. The preset values may be determined based on prior knowledge or historical experience.

As another example, the processor may determine an amount of increase of the fraud risk based on a degree of kinship between the associated subject corresponding to the second associated image and the candidate subject corresponding to the candidate face image. The more distant the kinship is, the more likely the kinship to be overlooked, and the greater the possibility that the target subject may complete the fraud behavior may be. Therefore, the more distant the kinship is, the greater the amount of increase of the fraud risk.

In some embodiments, in response to a determination that the second association-coincidence is smaller than or equal to the third coincidence threshold, the processor may proceed to the next sub-library. More descriptions regarding selecting the next sub-library may be found in FIG. 2 and the related descriptions thereof. The above operations may be repeated until all the sub-libraries that need to be traversed are traversed.

In some embodiments, in response to a determination that the second association-coincidence degree is greater than the third coincidence threshold, the fraud risk of the target subject may be adjusted, so that the risk assessment of the target subject may be more comprehensive based on a matching result by matching the current face image with the second associated image, thereby effectively preventing the fraud risk.

Figure 4:
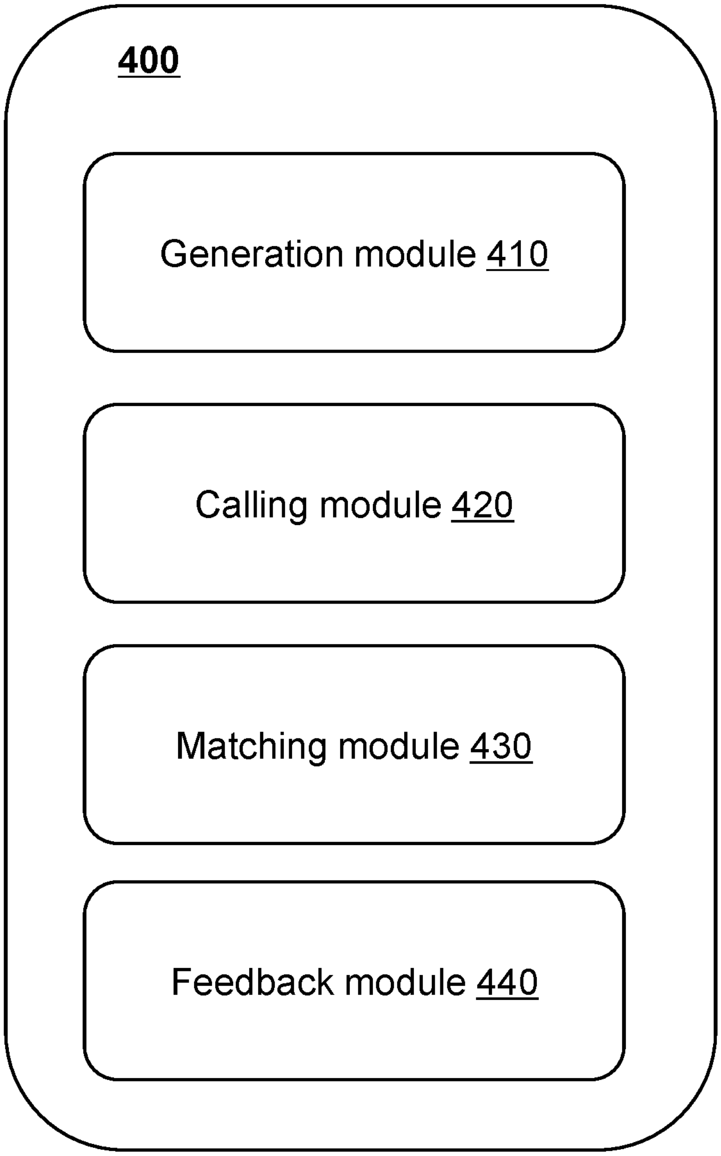
FIG. 4 is a system module diagram of a system for controlling a risk based on a distributed face library according to some embodiments of the present disclosure.

FIG. 4 is a system module diagram of a system for controlling a risk based on a distributed face library according to some embodiments of the present disclosure.

In some embodiments, the system 400 for controlling a risk based on a distributed face library may include a generation module 410, a calling module 420, a matching module 430, and a feedback module 440.

In some embodiments, the generation module 410 may be configured to obtain a living face image and generate a face retrieval demand signal.

In some embodiments, the calling module 420 may be configured to call the distributed face library based on the face retrieval demand signal.

In some embodiments, the matching module 430 may be configured to match the living face image through the distributed face library based on a preset retrieval strategy.

In some embodiments, in response to a determination that the living face image is not matched, the feedback module 440 may be configured to return a first risk result, and/or in response to a determination that the living face image is matched, the feedback module 440 may be configured to return a second risk result.

In some embodiments, the calling module 420 may be further configured to divide the distributed face library into a plurality of sub-libraries corresponding to a plurality of attributes, respectively, in various ways. More descriptions may be found in FIG. 1 and the relevant descriptions thereof.

In some embodiments, in response to a determination that a face feature is recognized in a detection region, the generation module 410 may be further configured to capture a current face image of a target subject and obtain a preset action image of the target subject and perform real person verification combined with the current face image of the target subject.

In some embodiments, the calling module 420 may be further configured to generate a data request field based on the face retrieval demand signal, determine a name, a location, and network configuration of the distributed face library based on the data request field, call a query statement based on the data request field and the name, the location, and the network configuration of the distributed face library, determine connection information of the distributed face library, and send the data request field to a preset node of the distributed face library to make a data connection be established between the preset node and at least one sub-library of the distributed face library.

In some embodiments, the matching module 430 may be further configured to obtain a standardized image based on a detected face by performing an alignment operation on the living face image, extract a face feature based on the standardized image to calculate a feature vector of the living face image, and search for a face image whose coincidence degree with the feature vector exceeds a first coincidence threshold in the distributed face library.

In some embodiments, in response to a determination that a matching misjudgment of the living face image occurs, the matching module 430 may be further configured to adjust the first coincidence threshold or retrain the distributed face library.

In some embodiments, in response to a determination that no target image exists in a current sub-library, the matching module 430 may be further configured to determine a candidate face image of the current sub-library, determine, based on the candidate face image, a first associated image of the candidate face image through a face knowledge graph, determine whether a first association-coincidence degree between the current face image and the first associated image is greater than the first coincidence threshold, and in response to a determination that the first association-coincidence degree is smaller than or equal to the first coincidence threshold, proceed to a next sub-library.

In some embodiments, the matching module 430 may be further configured to determine the first association-coincidence degree through weighting based on a similarity degree between the current face image and the first associated image.

In some embodiments, the matching module 430 may be further configured to determine a second age label through an age recognition model based on the current face image In some embodiments, in response to a determination that no target image exists in a current sub-library, the matching module 430 may be further configured to determine a candidate face image of the current sub-library, determine, based on the candidate face image, a second associated image of the candidate face image through a face knowledge graph, determine whether a second association-coincidence degree between the current face image and the second associated image is greater than a third coincidence threshold, in response to a determination that the second association-coincidence degree is greater than the third coincidence threshold, adjust a fraud risk of the target subject, or in response to a determination that the second association-coincidence degree is not greater than the third coincidence threshold, proceed to a next sub-library.

In some embodiments, the feedback module 440 may be further configured to store the living face image to a sub-library corresponding to the living face image of the distributed face library based on a preset library division strategy.

In some embodiments, the feedback module 440 may be further configured to record a calling duration of the distributed face library, and in response to a determination that the calling duration exceeds a preset duration threshold, generate a warning notification to redistribute the sub-library of the distributed face library.

In some embodiments, the processor may obtain the living face image, generate the face retrieval demand signal, and call the distributed face library based on the face retrieval demand signal. The distributed face library may include a plurality of sub-libraries. The processor may further match the living face image through the distributed face library based on the preset retrieval strategy. In response to a determination that the living face image is not matched, the processor may return the first risk result, or in response to a determination that the living face image is matched, the processor may return the second risk result.

In some embodiments, before the calling the distributed face library, the plurality of sub-libraries included in the distributed face library may be determined by at least one of: dividing the distributed face library into the plurality of sub-libraries corresponding to a plurality of first attributes, respectively, by using a common attribute of a plurality of types of documents as a division medium; determining a data differentiation within each data medium, selecting a data medium that exceeds a preset differentiation threshold, and dividing the distributed face library into the plurality of sub-libraries corresponding to a plurality of second attributes, respectively, according to a data feature of the data medium; or mixing data of a plurality of data mediums, performing modulo slicing based on a preset hash function, and dividing the distributed face library into the plurality of sub-libraries corresponding to a plurality of third attributes, respectively, according to a data slicing result.

In some embodiments, the obtaining a living face image and generating a face retrieval demand signal may include in response to a determination that a face feature is recognized in a detection region, capturing a current face image of a target subject, obtaining a preset action image of the target subject, and performing real person verification combined with the current face image of the target subject.

In some embodiments, the calling the distributed face library based on the face retrieval demand signal may include generating a data request field based on the face retrieval demand signal, determining a name, a location, and network configuration of the distributed face library based on the data request field, calling a query statement based on the data request field and the name, the location, and the network configuration of the distributed face library, determining connection information of the distributed face library, and sending the data request field to a preset node of the distributed face library to make a data connection be established between the preset node and at least one sub-library of the distributed face library.

In some embodiments, the matching the living face image through the distributed face library based on a preset retrieval strategy may include obtaining a standardized image based on a detected face by performing an alignment operation on the living face image, extracting a face feature based on the standardized image to calculate a feature vector of the living face image, and searching for a face image whose coincidence degree with the feature vector exceeds a first coincidence threshold in the distributed face library. The preset coincidence threshold may also referred to as the first coincidence threshold.

In some embodiments, after the searching for a face image whose coincidence degree with the feature vector exceeds a preset coincidence threshold in the distributed face library, in response to a determination that matching misjudgment of the living face image occurs, adjusting the first coincidence threshold or retraining the distributed face library may be included.

In some embodiments, in response to a determination that the living face image is not matched, the returning a first risk result may include storing the living face image to a sub-library corresponding to the living face image of the distributed face library based on the preset library division strategy.

In some embodiments, after the matching the living face image through the distributed face library based on the preset retrieval strategy, recording the calling duration of the distributed face library, and in response to a determination that the calling duration exceeds the preset duration threshold, generating the warning notification to redistribute the sub-library of the distributed face library may be further included.

More descriptions regarding the method for controlling a risk based on a distributed face library may be found in FIG. 1 and the relevant descriptions thereof.

Figure 5:
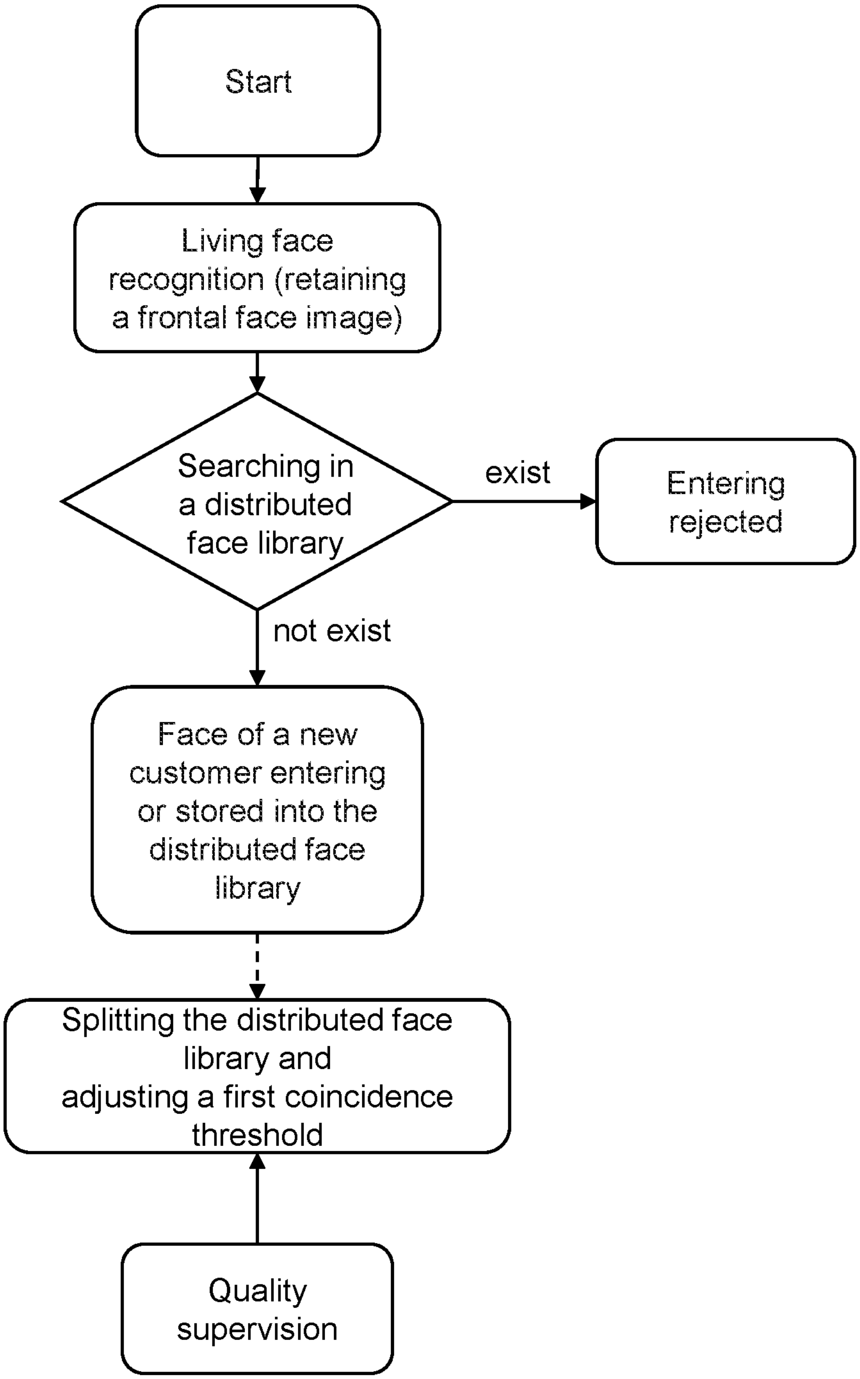
FIG. 5 is a flowchart illustrating an exemplary process of a risk control application of an intelligent terminal according to some embodiments of the present disclosure.

FIG. 5 is a flowchart illustrating an exemplary process of a risk control application of an intelligent terminal according to some embodiments of the present disclosure.

In some embodiments, the intelligent terminal may include a processor and a storage device. The storage device stores a computer program. When the computer program is executed by the processor, a method for controlling a risk based on a distributed face library may be implemented.

In one embodiment, taking the application of a loan risk control system as an example, the intelligent terminal may first perform living face recognition on a user and retain a frontal face image.

A face image of a new customer may be input into a pre-trained distributed face library. Since a service provided by the distributed face library is of a unique identifier, during registration, it may be required that the face image of the new customer does not exist in any sub-library of the distributed face library before being input into the system. Subsequently, when a regular customer is searched for in the distributed face library (e.g., the risk control system may ask the user to perform face recognition again when the regular customer changes important information and allow the operation only when the user and the regular customer are the same person), a specific sub-library of the regular customer may be required to be matched with quickly.

More descriptions regarding the dividing the face library in a multi-document scenario may be found in FIG. 1 and the relevant descriptions thereof.

For example, after the living face image is collected, the intelligent terminal may need to detect the face in the image, and the purpose of the detection may be to recognize a face region in the living face image and mark the face region. More descriptions regarding the process mentioned above may be found in FIG. 1 and the relevant descriptions thereof.

When a feature vector of a current face image is obtained, face search may be performed. The purpose of the face search may be to find a most similar face to the current face image in the distributed face library.

The distributed face library may return a plurality of numerical pairs of <face_token, coincidence degree score>. If a greatest coincidence degree score is greater than a first coincidence threshold, it may be determined that the face has been stored in the library (already exist), and the current face image may be not stored again (entering rejected). Conversely, if the greatest coincidence degree score is smaller than or equal to the first coincidence threshold, the current face image may be determined as a new face (not exist in the distributed face library), and a face of a new customer may be stored into the distributed face library.

When a calling duration of the distributed face library exceeds a preset duration threshold (e.g., 3 seconds, which may be determined by conducting a buried-point test at a front end, and the threshold may be as smaller than 3 seconds as possible if a majority of users choose to exit or perform other operations after waiting for 3 seconds), a warning notification may be issued to a corresponding administrator, and the administrator may determine whether to split the distributed face library. If an occasional timeout due to network jitter may be ignored, however, if the timeout is frequent or the service is unresponsive, the library may be considered to be split. If the distributed face library has already been split, it may be considered whether to split the distributed face library again in more detail. For example, if the distributed face library was originally split quarterly, the library may be split monthly now until the calling duration meeting the demand is achieved.

In addition to the above-mentioned supervision and feedback on the calling duration of the distributed face library, feedback on the quality supervision of the first coincidence threshold may also be required. Since a pre-trained dataset is not always equivalent to a dataset of actual business handling, the difference may affect the first coincidence threshold for determining a same face. For example, when cold start-up is performed, the system may be trained based on a public dataset, and at this time, the first coincidence threshold that the face library determines the same face may be 60. However, after real user data is accumulated for a period of time, it may be found that 60 is not sufficient to determine that two faces belong to the same person, and the first coincidence threshold may need to be increased to 65 to determine that two faces belong to the same person. In this case, it may be necessary to introduce a means of supervision of a face determination threshold offset to promptly adjust the first coincidence threshold. Merely by way of example, supervision and feedback on the first coincidence threshold offset may need to periodically review a judgment near a boundary of the first coincidence threshold. If the misjudgment (e.g., the system determines that two faces that do not belong to a same person belong to the same person or determine that two faces that belong to the same person belong to different persons) occurs near a current first coincidence threshold through the review, the first consideration may be given to whether the misjudgment may be resolved by adjusting the first coincidence threshold. For example, if an original first coincidence threshold is 60 and the first coincidence threshold needs to be adjusted to 65 for judgment, the first coincidence threshold may be adjusted to 65 preferentially. If the misjudgment fails to be resolved by adjusting the first coincidence threshold, the distributed face library may be retrained. For example, if a face dataset of the white faces is used for pre-training, however, the business is handled by the black race actually, the distributed face library may be retrained.

To a certain extent, the present disclosure solves the problem of being unable to construct a risk control system based on the unique identifier of the user in the absence of a unified identity document. After the risk control system is established, a risk control strategy may be accordingly formulated. The risk control strategy may include, but is not limited to upgrading from document blackening to face blackening.

The present disclosure further provides a storage medium storing a computer program. When the computer program is executed by the processor, the method for controlling a risk based on a distributed face library may be implemented.

As described above, in the method, the intelligent terminal, and the storage medium for controlling a risk based on a distributed face library provided by the present disclosure, the living face image may be retrieved and matched quickly through the distributed face library, which may quickly recognize the user identity of the unique identifier in the multi-document scenario, thereby improving the risk control capability of the system.

In the embodiments of the intelligent terminal and the storage medium provided by the present disclosure, all technical features of any of the above-described embodiments of the interaction manner may be included. The expansion and explanation of the present disclosure is similar to the various embodiments of the above method, which is not repeated herein.

The present disclosure further provides a computer program product including computer program codes. When the computer program codes run on a computer, the computer may perform the method described in the various possible implementations.

The present disclosure further provides a chip including a storage and a processor. The storage may be configured to store a computer program, and the processor may be configured to retrieve the computer program from the storage and run the computer program, so that a device installed with the chip may perform the method described in the various possible implementations.

It should be understood that the above scenarios are only intended as examples and do not limit the application scenarios of the technical solutions provided by the embodiments of the present disclosure. The technical solutions of the present disclosure may also be applied to other scenarios. For example, those skilled in the art may appreciate that the technical solutions provided by the embodiments of the present disclosure are also applicable to similar technical problems as the system architecture evolves and new business scenarios emerge.

The above serial numbers of the embodiments of the present disclosure are merely for the purpose of illustration and do not represent the advantages and disadvantages of the embodiments.

The operations of the method of the embodiments of the present disclosure may be adjusted, merged, and deleted according to actual needs.

The units of device of the embodiments of the present disclosure may be combined, divided, and deleted according to actual needs.

In the present disclosure, the same or similar terminology concepts, technical solutions, and/or application scenario descriptions are generally described in detail only at the first occurrence, but are not repeated for the sake of brevity at the subsequent occurrence. When understanding the technical solutions and other content of the present disclosure, for the same or similar terminology concepts, technical solutions, and/or application scenarios that are not described in detailed later, reference may be found in the relevant detailed descriptions before.

In the present disclosure, each embodiment is described with its own emphasis, and any part that is not detailed or documented in a specific embodiment may be referred to the relevant descriptions of other embodiments.

Various technical features of the technical solutions in the present disclosure may be arbitrarily combined. For the sake of conciseness of the description, all possible combinations of the technical features in the embodiments above have not been described. However, as long as these combinations of technical features do not contradict each other, these combinations should be considered within the scope of the present disclosure.

Based on the above descriptions of the embodiments, those skilled in the art may clearly understand that the methods in the above embodiments may be implemented using software in conjunction with the necessary general hardware platforms, and in some cases, hardware may also be employed. However, the former is often the preferred method of implementation. Based on this understanding, the technical solution of the present disclosure may be embodied in the form of a software product either in essence or part of the contribution to the prior art. The computer software product is stored on a storage medium (e.g., a Read Only Memory (ROM)/Random Access Memory (RAM), a disk, or an optical disk) and includes a set of instructions to enable a terminal device (e.g., a mobile phone, a computer, a server, a controlled terminal, or a network device) to perform the method described in each embodiment of the present disclosure.

The above embodiments may be implemented in whole or in part with software, hardware, firmware, or any combination thereof. When implemented using software, the embodiments may be implemented in whole or in part as a computer program product. The computer program product includes one or more computer instructions. When the computer program instructions are loaded and executed on a computer, all or part of the processes or functions in accordance with the embodiments of the present disclosure are generated. The computer may be a general-purpose computer, a specialized computer, a computer network, or other programmable device. The computer instructions may be stored in a storage medium or transmitted from one storage medium to another. For example, the computer instructions may be transmitted from a website, computer, server, or data center via a wired manner (e.g., coaxial cable, fiber optic, digital subscriber line) or a wireless manner (e.g., infrared, wireless, microwave, etc.) to another website, computer, server, or data center. The storage medium may be any usable medium accessible by a computer or a data storage device that include a server, a data center, etc. integrated by one or more usable mediums. The usable medium may include a magnetic medium, (e.g., a floppy disk, a storage disk, a tape), an optical medium (e.g., a digital video disc (DVD), or a semiconductor medium (e.g., a solid-state storage disk (SSD)), etc.

The above embodiments are only preferred embodiments of the present disclosure and are not intended to limit the scope of the present disclosure. Any equivalent structure or equivalent process transformation using the contents of the present disclosure and the accompanying drawings, or directly or indirectly applying them in other related technical fields are all included in the scope of protection of the present disclosure.

What is claimed is:

1. A method for controlling a risk based on a distributed face library, implemented by a processor, comprising:

obtaining a living face image and generating a face retrieval demand signal;

calling the distributed face library based on the face retrieval demand signal, the distributed face library including a plurality of sub-libraries;

matching the living face image through the distributed face library based on a preset retrieval strategy;

wherein the matching the living face image through the distributed face library based on a preset retrieval strategy further comprises:

obtaining a standardized image based on a detected face by performing an alignment operation on the living face image;

extracting a face feature based on the standardized image to calculate a feature vector of the living face image;

searching for a face image whose coincidence degree with the feature vector exceeds a first coincidence threshold in the distributed face library;

and in response to a determination that no target image exists in a current sub-library, wherein a coincidence degree between the target image and a current face image of a target subject is greater than the first coincidence threshold:

determining a candidate face image of the current sub-library, wherein a coincidence degree between the candidate face image and the current face image is greater than a second coincidence threshold, and the second coincidence threshold is smaller than the first coincidence threshold;

determining, based on the candidate face image, a first associated image of the candidate face image through a face knowledge graph, wherein the first associated image includes face images of a candidate subject corresponding to the candidate face image at different periods;

determining whether a first association-coincidence degree between the current face image and the first associated image is greater than the first coincidence threshold;

and in response to a determination that the first association-coincidence degree is smaller than or equal to the first coincidence threshold, proceeding to a next sub-library:

in response to a determination that the living face image is not matched, returning a first risk result; or in response to a determination that the living face image is matched, returning a second risk result.

2. The method of claim 1, wherein the plurality of sub-libraries are determined by at least one of:

dividing the distributed face library into the plurality of sub-libraries corresponding to a plurality of first attributes, respectively, by using a common attribute of a plurality of types of documents as a division medium;

determining a data differentiation within each data medium, selecting a data medium that exceeds a preset differentiation threshold, and dividing the distributed face library into the plurality of sub-libraries corresponding to a plurality of second attributes, respectively, according to a data feature of the data medium; or mixing data of a plurality of data mediums, performing modulo slicing based on a preset hash function, and dividing the distributed face library into the plurality of sub-libraries corresponding to a plurality of third attributes, respectively, according to a data slicing result.

3. The method of claim 1, wherein the obtaining a living face image and generating a face retrieval demand signal includes:

in response to a determination that a face feature is recognized in a detection region, capturing a current face image of a target subject; and obtaining a preset action image of the target subject and performing real person verification combined with the current face image of the target subject.

4. The method of claim 1, wherein the calling the distributed face library based on the face retrieval demand signal includes:

generating a data request field based on the face retrieval demand signal;

determining a name, a location, and network configuration of the distributed face library based on the data request field; and calling a query statement based on the data request field and the name, the location, and the network configuration of the distributed face library, determining connection information of the distributed face library, and sending the data request field to a preset node of the distributed face library to make a data connection be established between the preset node and at least one sub-library of the distributed face library.

5. The method of claim 1, further comprising:

in response to a determination that a matching misjudgment of the living face image occurs, adjusting the first coincidence threshold or retraining the distributed face library.

6. The method of claim 1, further comprising:

for each of a plurality of first associated images, determining the first association-coincidence degree through weighting based on a similarity degree between the current face image and the first associated image, wherein a weight of the similarity degree is related to a distance between a first age label of the first associated image and a second age label of the target subject.

7. The method of claim 6, further comprising:

determining the second age label through an age recognition model based on the current face image, the age recognition model being a machine learning model.

8. The method of claim 1, further comprising:

in response to a determination that no target image exists in a current sub-library, determining a candidate face image of the current sub-library, wherein a coincidence degree between the target image and a current face image of a target subject is greater than the first coincidence threshold, a coincidence degree between the candidate face image and the current face image is greater than a second coincidence threshold, and the second coincidence threshold is smaller than the first coincidence threshold;

determining, based on the candidate face image, a second associated image of the candidate face image through a face knowledge graph, wherein the second associated image includes a face image of an associated subject, the associated subject is associated with a candidate subject corresponding to the candidate face image, and the associated subject includes a relative of the candidate subject;

determining whether a second association-coincidence degree between the current face image and the second associated image is greater than a third coincidence threshold;

in response to a determination that the second association-coincidence degree is greater than the third coincidence threshold, adjusting a fraud risk of the target subject; or in response to a determination that the second association-coincidence is smaller than or equal to the third coincidence threshold, proceeding to a next sub-library.

9. The method of claim 1, wherein in response to a determination that the living face image is not matched, the returning a first risk result includes:

storing the living face image to a sub-library corresponding to the living face image of the distributed face library based on a preset library division strategy.

10. The method of claim 9, further comprising:

recording a calling duration of the distributed face library; and in response to a determination that the calling duration exceeds a preset duration threshold, generating a warning notification to redistribute the sub-library of the distributed face library.

11. A system for controlling a risk based on a distributed face library, comprising a generation module, a calling module, a matching module, and a feedback module, wherein the generation module is configured to obtain a living face image and generate a face retrieval demand signal;

the calling module is configured to call the distributed face library based on the face retrieval demand signal, the distributed face library including a plurality of sub-libraries;

the matching module is configured to match the living face image through the distributed face library based on a preset retrieval strategy, and the matching module is further configured to:

obtain a standardized image based on a detected face by performing an alignment operation on the living face image;

extract a face feature based on the standardized image to calculate a feature vector of the living face image;

search for a face image whose coincidence degree with the feature vector exceeds a first coincidence threshold in the distributed face library:

in response to a determination that no target image exists in a current sub-library, wherein a coincidence degree between the target image and a current face image of a target subject is greater than the first coincidence threshold:

determine a candidate face image of the current sub-library, wherein a coincidence degree between the candidate face image and the current face image is greater than a second coincidence threshold, and the second coincidence threshold is smaller than the first coincidence threshold;

determine, based on the candidate face image, a second associated image of the candidate face image through a face knowledge graph, wherein the second associated image includes a face image of an associated subject, the associated subject is associated with a candidate subject corresponding to the candidate face image, and the associated subject includes a relative of the candidate subject;

determine whether a second association-coincidence degree between the current face image and the second associated image is greater than a third coincidence threshold;

in response to a determination that the second association-coincidence degree is greater than the third coincidence threshold, adjust a fraud risk of the target subject; or in response to a determination that the second association-coincidence degree is smaller than or equal to the third coincidence threshold, proceed to a next sub-library;

the feedback module is configured to:

in response to a determination that the living face image is not matched, return a first risk result; or in response to a determination that the living face image is matched, return a second risk result.

12. The system of claim 11, wherein the calling module is further configured to:

dividing the distributed face library into the plurality of sub-libraries corresponding to a plurality of first attributes, respectively, by using a common attribute of a plurality of types of documents as a division medium;

determining a data differentiation within each data medium, selecting a data medium that exceeds a preset differentiation threshold, and dividing the distributed face library into the plurality of sub-libraries corresponding to a plurality of second attributes, respectively, according to a data feature of the data medium; or mixing data of a plurality of data mediums, performing modulo slicing based on a preset hash function, and dividing the distributed face library into the plurality of sub- libraries corresponding to a plurality of third attributes, respectively, according to a data slicing result.

13. The system of claim 11, wherein the generation module is further configured to:

in response to a determination that a face feature is recognized in a detection region, capture a current face image of a target subject; and obtaining a preset action image of the target subject and performing real person verification combined with the current face image of the target subject.

14. The system of claim 11, wherein the calling module is further configured to:

generating a data request field based on the face retrieval demand signal;

determining a name, a location, and network configuration of the distributed face library based on the data request field; and calling a query statement based on the data request field and the name, the location, and the network configuration of the distributed face library, determining connection information of the distributed face library, and sending the data request field to a preset node of the distributed face library to make a data connection be established between the preset node and at least one sub-library of the distributed face library.

15. The system of claim 11, wherein the matching module is further configured to:

in response to a determination that a matching misjudgment of the living face image occurs, adjust the first coincidence threshold or retrain the distributed face library.

16. An intelligent terminal, comprising a processor and a storage device, wherein the storage device stores a computer program, and when executed by the processor, the computer program causes the processor to implement a method comprising:

obtaining a living face image and generating a face retrieval demand signal;

calling the distributed face library based on the face retrieval demand signal, the distributed face library including a plurality of sub-libraries;

matching the living face image through the distributed face library based on a preset retrieval strategy;

wherein the matching the living face image through the distributed face library based on a preset retrieval strategy further comprises:

obtaining a standardized image based on a detected face by performing an alignment operation on the living face image;

extracting a face feature based on the standardized image to calculate a feature vector of the living face image;

searching for a face image whose coincidence degree with the feature vector exceeds a first coincidence threshold in the distributed face library;

and in response to a determination that no target image exists in a current sub-library, wherein a coincidence degree between the target image and a current face image of a target subject is greater than the first coincidence threshold:

determining a candidate face image of the current sub-library, wherein a coincidence degree between the candidate face image and the current face image is greater than a second coincidence threshold, and the second coincidence threshold is smaller than the first coincidence threshold;

determining, based on the candidate face image, a first associated image of the candidate face image through a face knowledge graph, wherein the first associated image includes face images of a candidate subject corresponding to the candidate face image at different periods;

determining whether a first association-coincidence degree between the current face image and the first associated image is greater than the first coincidence threshold;

and in response to a determination that the first association-coincidence degree is smaller than or equal to the first coincidence threshold, proceeding to a next sub-library;

in response to a determination that the living face image is not matched, returning a first risk result; or in response to a determination that the living face image is matched, return a second risk result.

* * * * *